March 15, 1955 R. W. WILSON 2,704,017
ADJUSTABLE FURROW WHEEL
Filed Feb. 29, 1952
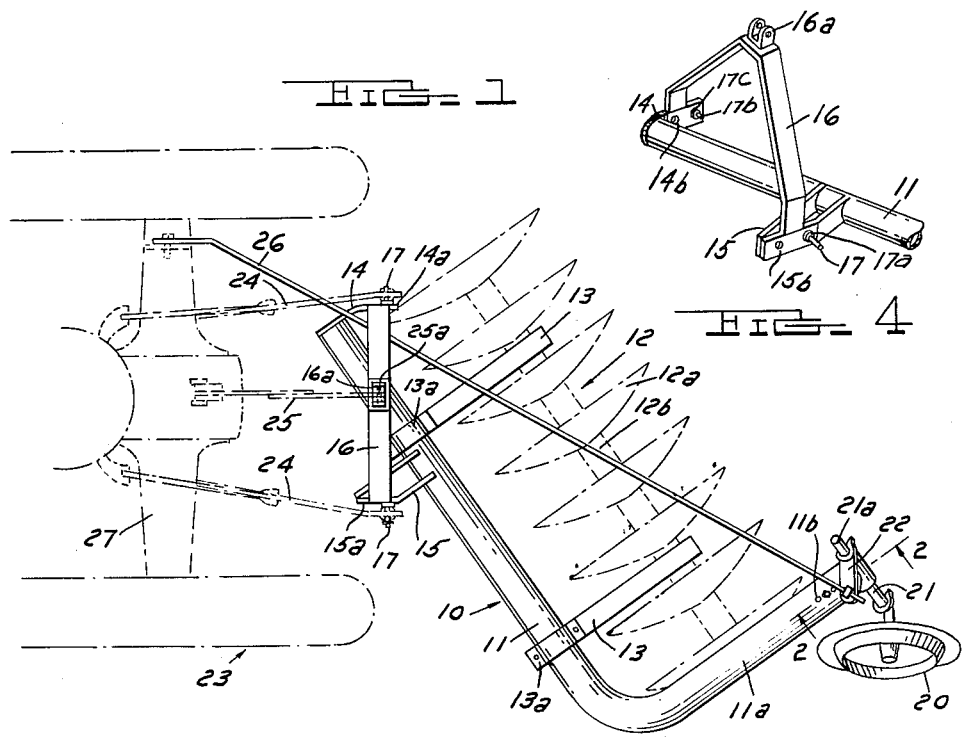
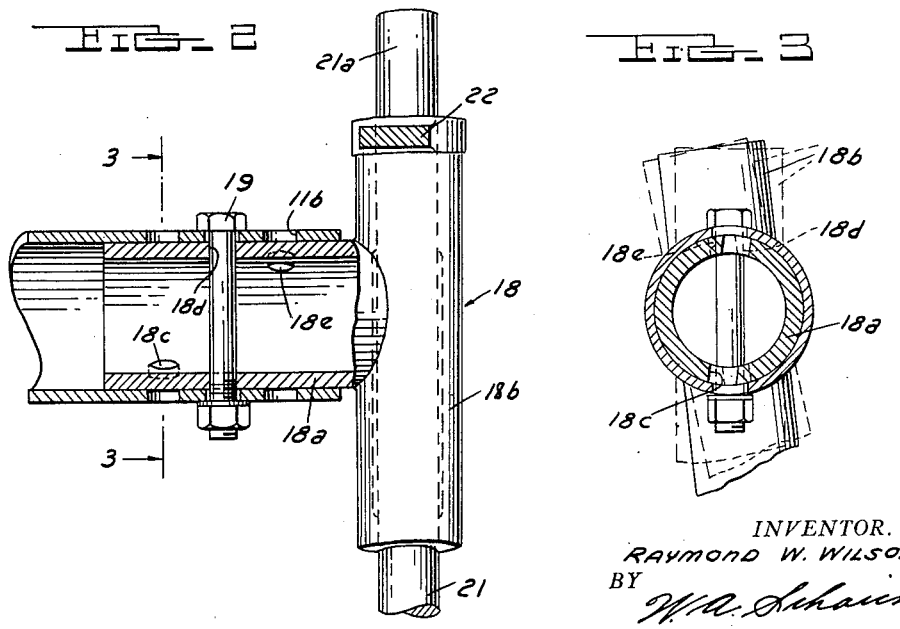
INVENTOR.
RAYMOND W. WILSON
BY
ATTORNEYS ered on a gang bolt (not shown) by
a plurality of spacer members 12b. A pair of bearing
supports 13, mounted in laterally spaced relationship on
the main frame 11, support and journal disc gang 12
parallel to the main portion of frame 11. The support
arms 13 project somewhat rearwardly from the main
frame 11 and are secured to such frame by a pair of
clamps 13a which respectively surround a portion of the
main frame 11 and are suitably secured to the support
arms 13. The support arms 13 are disposed in generally
perpendicular relationship to the main frame 11 and lie
in a substantially horizontal plane. Suitable bearing
hangers (not shown) connect the disc gang 12 to the
support arms 13.

The forward end of the main frame 11 has a plate-like
bracket 14 welded to its end and such bracket extends
rearwardly at an angle to the main frame 11, as best
shown at 14a in Figure 1. A similar bracket 15 is welded
to the forwardly facing edge of the main frame 11. The
bracket 15, however, extends forwardly and has an end
portion 15a bent at an angle to the tubular frame 11, as
best shown in Figure 1. An upstanding A-frame 16 has
its ends respectively welded to the end portions 14a and
15a of brackets 14 and 15. Such mounting of the A-frame disposes such A-frame at an angle to the main
frame 11, as best illustrated in Figure 1. A U-shaped
bracket 16a is welded to the top of A-frame 16. The
end portions 14a and 15a of brackets 14 and 15 have, respectively, a plurality of longitudinally spaced apertures
14b and 15b. The apertures 14b and 15b conveniently
receive a pair of horizontal mounting pins 17. Each
mounting pin 17 has an integral annular ring-like portion
17a and a threaded end portion 17b. The threaded end
portion 17b of each pin 17 is inserted through a selected
aperture 14b or 15b with the annular ring in abutment
with the face of the bracket, and a nut 17c screwed onto
such threaded end secures each of such pins to its respective bracket. Pins 17 may be selectively inserted in apertures 14b and 15b to vary the working angle of the disc
gang 12 as will be later described.

The trailing end of the end portion 11a of frame 11
carries an upright furrow wheel shaft housing 18. The
housing 18 is a unitary cast member of generally T-shaped configuration and comprises a horizontal tubular
stem portion 18a and a vertical shaft housing 18b integrally connected to the stem portion 18a. Both the
stem portion 18a and the housing portion 18b have cored
axial bores. The stem portion 18a has three diametrically
disposed holes 18c, 18d and 18e which are axially spaced
apart. The holes 18c and 18e are angularly disposed
relative to the hole 18d in opposite directions, as best
shown in Figure 2, and for a purpose to later appear.
The stem portion 18a is snugly but slidably received by
the end tubular end portion 11a of frame 11, and a bolt
19, selectively inserted in any one of three holes 11b
provided in the trailing end of the portion 11a of frame 11
and a selected hole 18c, 18d or 18e in stem 18a, secures
the stem portion 11a against rotation. The holes 11b
are diametrically disposed and are all in the same vertical
plane, as best shown in Figures 1 and 2, and such holes
are likewise axially spaced apart for a purpose to be later
described.

The trailing end of the frame portion 11a is supported
by a furrow wheel 20. The furrow wheel 20 is journaled
on a crank axle 21 and the crank axle 21 has a vertical
shaft portion 21a which is rotatably journaled in the
housing 18b. The upper end of shaft 21a projects out of
the housing 18b and a crank arm 22 is suitably secured
to such arm. The crank arm 22 also prevents axial displacement of the shaft 21a.

The disc tiller 10 is preferably used with a tractor 23
of well-known make, which has a pair of power-lifted,
laterally spaced hitch links 24. The hitch links 24 have
apertured trailing ends which are respectively mounted on
the horizontal mounting pins 17 secured in the end portions 14a and 15a of the brackets 14 and 15. A top link
25 universally connected to the top of the tractor differential housing has its trailing end pivotally connected between the arms of the U-shaped brackets 16a by a transverse pin 25a. A tie rod or link 26 has its forward end

United States Patent Office 2,704,017
Patented Mar. 15, 1955

2,704,017

ADJUSTABLE FURROW WHEEL

Raymond W. Wilson, Ferndale, Mich., assignor, by mesne assignments, to Ford Motor Company, Dearborn, Mich., a corporation of Delaware Application February 29, 1952, Serial No. 274,149

2 Claims. (Cl. 97—47.1)

This invention relates to an improved angularly adjustable frame and laterally adjustable furrow wheel for a disc type implement.

Disc type implements, such as disc tillers and disc plows, are usually used where the soil conditions are so hard or abrasive as to practically preclude the use of a moldboard plow. Unfortunately, however, a disc plow or disc tiller produces a large side draft force on the tractor which adversely affects the steerability of the tractor. The side draft forces of the disc plow can, however, be greatly reduced by a furrow wheel which contacts the furrow wall made by the most rearwardly disposed disc. The furrow wheel is also frequently connected to the tractor by a connecting link so that such furrow wheel is steered as the tractor turns to aid in turning the implement.

Most tractor mounted disc plows and disc tillers have no means for adjustment of the working angle of the discs so that the usual steerable furrow wheel performs quite satisfactorily. However, where the disc plow has a frame which may be variably angled relative to the tractor to permit varying the working angle of the disc, it is essential that the furrow wheel be suitably laterally adjustable to compensate for changes in working angle of the disc gang so that it will fully contact the furrow wall for all settings of the working angle of the disc gang and hence be more effective in resisting side draft forces. Otherwise as the gang working angle is changed by angularly shifting the frame, the furrow wheel will be improperly positioned relative to the furrow wall.

Accordingly, it is an object of this invention to provide an improved adjustable frame and adjustable furrow wheel mounting for a disc type implement.

Another object of this invention is to provide an improved adjustable mounting for a furrow wheel for disc type implements which will permit tilting or canting of the furrow wheel for lateral adjustment to suit changes in the working angle of the disc gang in order for the furrow wheel to fully contact the furrow wall for all such angular settings of the disc gang.

The specific nature of this invention, as well as other objects and advantages thereof, will become apparent to those skilled in the art from the following detailed description, taken in conjunction with the drawings on which, by way of preferred example only, is illustrated one embodiment of this invention.

On the drawings:

Figure 1 is a reduced scale plan view of a disc tiller shown attached to the trailing hitch linkage of a tractor incorporating the improved frame and furrow wheel mounting constructed in acocrdance with this invention;

Figure 2 is an enlarged detail, sectional view taken along the plane 2—2 of Figure 1;

Figure 3 is a sectional view taken along the plane 3—3 of Figure 2 showing in dotted outline the several positions of angular adjustment of the furrow wheel housing; and Figure 4 is a fragmentary detail, perspective view of the implement A-frame showing the selective hitch points usable to provide disc gang angle adjustment.

As shown on the drawings:

A disc tiller 10 as shown in Figure 1 is of a type which utilizes a furrow wheel to reduce the side-draft forces of such implement on the tractor. The disc tiller 10 comprises a tubular main frame 11 which has a trailing end portion 11a bent at right angles to the main portion of such frame. The main frame 11 supports a disc gang 12 which comprises the usual concave discs 12a laterally suitably connected to the underside of the tractor rear axle 27 and its trailing end is suitably pivotally connected to the end of crank arm 22 by which the furrow wheel is steered as the tractor is turned in a well-known manner.

Referring to Figure 1, the mounting pins 17 are secured in the apertures 14b and 15b which are in opposed alignment. When so positioned, the bolt 19 is inserted through the central aperture 18d in the stem portion 18a. When the furrow wheel housing 18 is so secured to the trailing end of the frame portion 11a, it is vertically inclined somewhat, as best shown in Figure 2, and such positioning of the furrow wheel shaft 21a and hence furrow wheel 20 is best suited for the working angle of the disc gang 11 shown in Figure 1. In the event it is desired to decrease the working angle of the disc gang 12, the mounting pin 17 in the bracket 14 is moved to a more forwardly disposed aperture 14b in such bracket which reduces the angular disposition of the frame 11, and hence gang 12, relative to the line of draft of the tractor. When the gang 12 is so angled, furrow wheel 20 if disposed in its central position of angular adjustment as shown in Figures 1, 2 and 3, would tend to ride up the furrow wall. This is due to the rear end frame portion 11a being swung nearer to the furrow wall cut by the rearmost disc 12a. Hence, not only would the effectiveness of the furrow wheel 20 as a side draft force arrestor be reduced, but also such wheel would cause the disc gang to cut at a shallower depth.

To adjust the furrow wheel 20 to overcome this situation, the furrow wheel 20 is tilted or canted away from the furrow wall to enable the wheel 20 to properly engage such furrow wall. In such case, the bolt 19 is removed and the housing 18 rotated in a clockwise direction (Figure 3) until the hole 18e is aligned with one of the holes 11b, whereupon the bolt 19 is inserted through such aligned holes to lock the housing 18 in its new position. Thus the furrow wheel 20 will be canted inwardly relative to the frame 11 by approximately the amount the end of frame portion 11a has been moved nearer the furrow wall to permit the furrow wheel to properly engage the furrow wall.

Conversely, when the disc gang working angle is increased by repositioning the pins 17 in brackets 14 and 15 to allow the rear end of frame portion 11a to move inwardly a greater extent than shown in Figure 1, the bolt 19 is removed to permit aligning the hole 18c with a selected hole 11b to cant the furrow wheel outwardly relative to frame 11 approximately the same amount the frame end 11a was moved inwardly to reposition the furrow wheel for optimum results.

While canting of the furrow wheel 20 is effective in maintaining its proper relationship relative to the furrow wall for angular adjustments of the frame relative to the tractor, it is sometimes necessary or desirable to increase the effective lateral spacing of such furrow wheel relative to the tractor. This is conveniently accomplished by merely thrusting the stem portion further into the tubular end 11a or withdrawing it therefrom. The plurality of holes 11b in the end of the stem portion 11a conveniently permit such adjustment to be selectively made to suit the particular condition as before described.

From the foregoing description, it is thus clearly apparent that there is here provided an improved adjustable mounting for a disc implement furrow wheel which conveniently permits canting such furrow wheel to selectively laterally position the furrow wheel to suit variations in the working angle of the disc gang in order to properly position such furrow wheel relative to the furrow wall regardless of the working angle of the disc gang.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of power-lifted laterally spaced hitch links, a disc type implement comprising a generally horizontal tubular frame, an upright A-frame secured to said tubular frame in angularly disposed relationship thereto; a disc gang journaled on said frame, a pair of mounting pins for the reception of the hitch links, means for respectively mounting said pins in a selected one of a plurality of longitudinally spaced positions on the lower ends of said A-frame, said pins permitting selective angular adjustment of said frame relative to the tractor longitudinal axis for varying the working angle of the disc gang, a substantially rearwardly extending horizontal tubular end portion on the frame disposed at right angles thereto, a housing member having a cylindrical stem portion for insertion in the frame end portion, locking means for securing said stem portion therein in a selected position of angular adjustment, a vertical shaft journaled in said housing, and a furrow wheel rotatably mounted on said shaft, said housing being angularly adjustable for laterally spacing said furrow wheel relative to the bent frame end so as to permit said furrow wheel to engage the furrow wall for any selected angular adjustment of the frame.

2. The combination defined in claim 1 wherein said locking means comprises a plurality of diametrically opposed angularly spaced holes in said stem portion, and a bolt insertable through a pair of diametrically opposed holes in the bent frame end portion and a selected pair of opposed aligned holes of said stem transverse holes.

References Cited in the file of this patent

UNITED STATES PATENTS

| | | |
|---|---|---|
| 273,508 | Garst | Mar. 6, 1883 |
| 828,160 | Weeks | Aug. 7, 1906 |
| 1,855,459 | Strandlund | Apr. 26, 1932 |
| 2,416,194 | Miller | Feb. 18, 1947 |
| 2,445,145 | Love | July 13, 1948 |
| 2,456,465 | Strandlund | Dec. 14, 1948 |
| 2,467,111 | Coon | Apr. 12, 1949 |
| 2,609,742 | Love | Sept. 9, 1952 |
| 2,652,762 | Ashley | Sept. 22, 1953 |
| 2,655,855 | Holden | Oct. 20, 1953 |